United States Patent [19]
Berneking et al.

[11] Patent Number: 4,970,644
[45] Date of Patent: Nov. 13, 1990

[54] RECONFIGURABLE WELL LOGGING SYSTEM

[75] Inventors: D. J. Berneking; P. M. Calmes, both of Austin; P. H. Wallace, Round Rock, all of Tex.

[73] Assignee: Schlumberger Technology Corporation, Houston, Tex.

[21] Appl. No.: 376,153

[22] Filed: Jun. 30, 1989

Related U.S. Application Data

[63] Continuation of Ser. No. 144, Jan. 2, 1987, abandoned.

[51] Int. Cl.⁵ .............................................. G06F 11/20
[52] U.S. Cl. .................................... 364/422; 371/11.1
[58] Field of Search ...................... 364/422; 371/9, 11, 371/13

[56] References Cited

U.S. PATENT DOCUMENTS

| | | | |
|---|---|---|---|
| 3,787,816 | 1/1974 | Hauck | 371/11 |
| 4,321,670 | 3/1982 | Timmons . | |
| 4,352,103 | 9/1982 | Slater | 371/8 |
| 4,398,272 | 8/1983 | Siebert . | |
| 4,412,281 | 10/1983 | Works | 371/9 |
| 4,490,788 | 12/1984 | Rasmussen . | |
| 4,531,204 | 7/1985 | Vanderschel . | |
| 4,627,054 | 12/1986 | Cooper | 371/11 |
| 4,627,055 | 12/1986 | Mori | 371/8 |
| 4,633,467 | 12/1986 | Abel | 371/11 |
| 4,635,184 | 1/1987 | Schuss | 371/9 |

OTHER PUBLICATIONS

"Computer Dictionary", Fourth Edition, Charles J. Sippl., 1985.

Primary Examiner—Jerry Smith
Assistant Examiner—Gail O. Hayes
Attorney, Agent, or Firm—Cox & Smith Incorporated

[57] ABSTRACT

A method and apparatus for producing a reconfigurable well-logging data acquisition and interpretations system for performing a plurality of discrete data processing functions and which achieves a level of system reliability approximating that of a redundant system, but without total hardware redundancy.

4 Claims, 7 Drawing Sheets

FIG. 4A

| | | 1. EVERYTHING WORKING (BASIC 1C) | 2. HOST DISK FAILED (DB/NO SM) | 3. HOST PROCESSOR FAILED | 4. GP DISK FAILED (DUAL-BAY) | 5. GP PROCESSOR FAILED | 6. ACQ PROCESSOR FAILED | 7. GP-DEQNA SECONDARY FAILED | 8. ACQ-COM FAILED |
|---|---|---|---|---|---|---|---|---|---|
| CG | MONITOR | L | L | L | L | L | L | L | L |
| CG | RASTER-TECH | L | L | L | L | L | L | L | L |
| CG | CG-CONTIF | L | L | L | L | L | L | L | L |
| CG | CONTSWITCH | L | A | L | A | A | L | L | L |
| BHI | VT220 | | | | | | | | |
| COM | DEQ-GP | | | | | | | | A/R |
| COM | DEQ-GS | L | L | L | L | L | L | F/R | F |
| COM | DEQ-A | B/L | B/L | B/L | B/L | B/L | B/L | B/L | F/L |
| COM | ENSW-A | B/L | B/L | B/L | B/L | B/L | B/L | B/L | F/L |
| COM | DEQ-HP | B/L | B/L | B/L | B/L | B/L | B/L | B/L | B/L |
| COM | DEQ-HS | | | | | | | R/R | |
| COM | DELNI-X | B/L | B/L | B/L | B/L | B/L | B/L | B/L | B/L |
| COM | DELNI-Y | | | | | | | | |

FIG. 4

| FIG. 4A | FIG. 4B |
|---|---|
| FIG. 4C | FIG. 4D |

B = BOOTING EQUIPMENT
L = LOGGING EQUIPMENT
F = FAILED EQUIPMENT
R = REPLACEMENT EQUIPMENT
D = DISABLED BY FAILURE
A = ACTIVATED SWITCH EQUIPMENT

RECONFIGURABLE WELL LOGGING SYSTEM

This application is a continuation of co-pending application No. 07/000,144, filed on Jan. 2, 1987, now abandoned.

BACKGROUND

1. Field of the Invention

The present invention relates to a new method and apparatus for providing a reconfigurable well-logging data acquisition and interpretation system that provides a lower-cost, higher reliability data acquisition and interpretation system than previously available while retaining redundant response to component failure.

2. Background

Well-logging systems today typically use sophisticated on-site computer systems for acquiring and interpreting well-logging data from a down-hole logging tool. Such systems are typically operated in harsh environments, far from suitable repair locations. System failures in a well-logging operation create expensive and unacceptable down-time. Thus, a high degree of system reliability is an essential attribute for such systems.

Historically, a high degree of system reliability has been attained through total hardware redundancy with little or no use of the redundant hardware until a failure occurs. Failure recovery mechanisms for such redundant systems basically consist of two complete compliments of the hardware required to perform the particular function of the system. When the primary system fails, it is totally replaced by the back-up system. Back-up or redundant systems, of course, add significantly to the cost of the system. Secondly, well-logging systems must be transported to the well site and are typically mounted in trucks or other transport means where adequate space is usually lacking. Back-up or redundant systems occupy valuable space which could be put to better use.

One possible solution is simply providing a box of spare hardware components and parts for the primary system based upon historical failure rate data for individual components required in the system. That could possibly meet the availability requirement at lower cost figures for acquisition and space requirements, but the time required to diagnose which component had failed, and to physically remove it and replace it is too long.

The present invention arose from the realization that a spare set of components might not be necessary if the required processing could be redistributed across the remaining, operational elements in the system in the event of a failure of one or more individual components. The inventors have determined that it is possible and practical to switch the failed element or elements out of the system and redistribute the processing task to complete the particular function the system was intended to perform That provides a lower-cost, highly reliable, adaptable system.

SUMMARY OF THE INVENTION

The present system can recover from the most probable hardware failures by using software and hardware switches to assume a new configuration and continue the mission of the system in an minimum amount of time. The present invention also allows for a range of performance and efficiencies as a result of the system's ability to readily change configuration. The present invention also permits a configuration to readily evolve along a price verses performance curve. The present invention also does not use the traditional total redundancy philosophy in order to achieve the reliability desired.

The apparatus of the present invention provides a reconfigurable well-logging data acquisition and interpretation system for performing a variety of discrete data processing functions and which achieves a level of system reliability approximating that of a redundant system without total hardware redundancy. The apparatus of the present invention achieves that result by providing a plurality of hardware component groupings each of which are configured and assigned responsibility for performing selected discrete processing functions. Those hardware component groupings are interconnected through a network to provide for distributed processing of the several discrete data processing functions. The components of the several hardware component groupings are chosen such that if one or more components of a grouping fail, the system may be reconfigured by transferring the data processing function assigned to the grouping, which is now failed, to another operable grouping.

The method of the present invention provides a process for producing such a well-logging data acquisition and interpretation system having a high level of system reliability. The method of the present invention achieves that result through identification of the discrete data processing functions required by the entire well-logging data acquisition and interpretation system; analyzing those discrete data processing functions to determine the minimal hardware requirements necessary to perform each of those discrete functions, selecting a plurality of data processor hardware component groupings such that each such grouping has at least one central processor and such additional components as required for those groupings to perform at least one of the discrete data processing functions; selectively assigning responsibility for performing the several discrete data processing functions to those data processor hardware component groupings such that responsibility for performing the overall required system data processing functions are distributed over those hardware component groupings without duplication; identifying the components used in those groupings which are most likely to fail; analyzing, for each component failure, which of the discrete data processing functions are disabled and which, if any, of the remaining hardware component groupings have the requisite components necessary to assume responsibility for performing the disabled data processing function; and, in the event the existing hardware component groupings do not have the components necessary to assume that responsibility, selectively adding hardware components until the system can be reconfigured to recover from the most common component failures.

Therefore, an object of the present invention is to provide a well-logging data acquisition and interpretation system that provides a lower-cost, higher reliability data acquisition and interpretation system than previously available through use of total redundant hardware components.

It is further an object of the present invention to provide a method for determining hardware configurations which can achieve the objective of providing a data acquisition and interpretation system having a reliability approximating that of a total hardware redundant system, but at a lower cost.

It is yet a further object of the present invention to provide a well-logging data acquisition and interpretation system which permits ready and facile reconfiguration in the event of a component failure.

It is yet a further object of the present invention to permit a configuration to evolve in which significantly increased levels of reliability can be obtained with relatively minor increases in component redundancy and, therefore, cost.

These and other objects, features and advantages of the invention will become evident in light of the following detailed description, viewed in conjunction with the referenced drawings of a preferred reconfiguration advisor controller according to the invention. The foregoing and following description of the invention is for exemplary purposes only. The true spirit and scope of the invention is set forth in the appended claims.

BRIEF DESCRIPTION OF THE DRAWINGS

FIGS. 4A, 4B, 4C and 4D together form (comprising 4A–4D) a "failure table" in accordance with the method of the present invention.

DETAILED DESCRIPTION OF THE INVENTION

Figure 1:
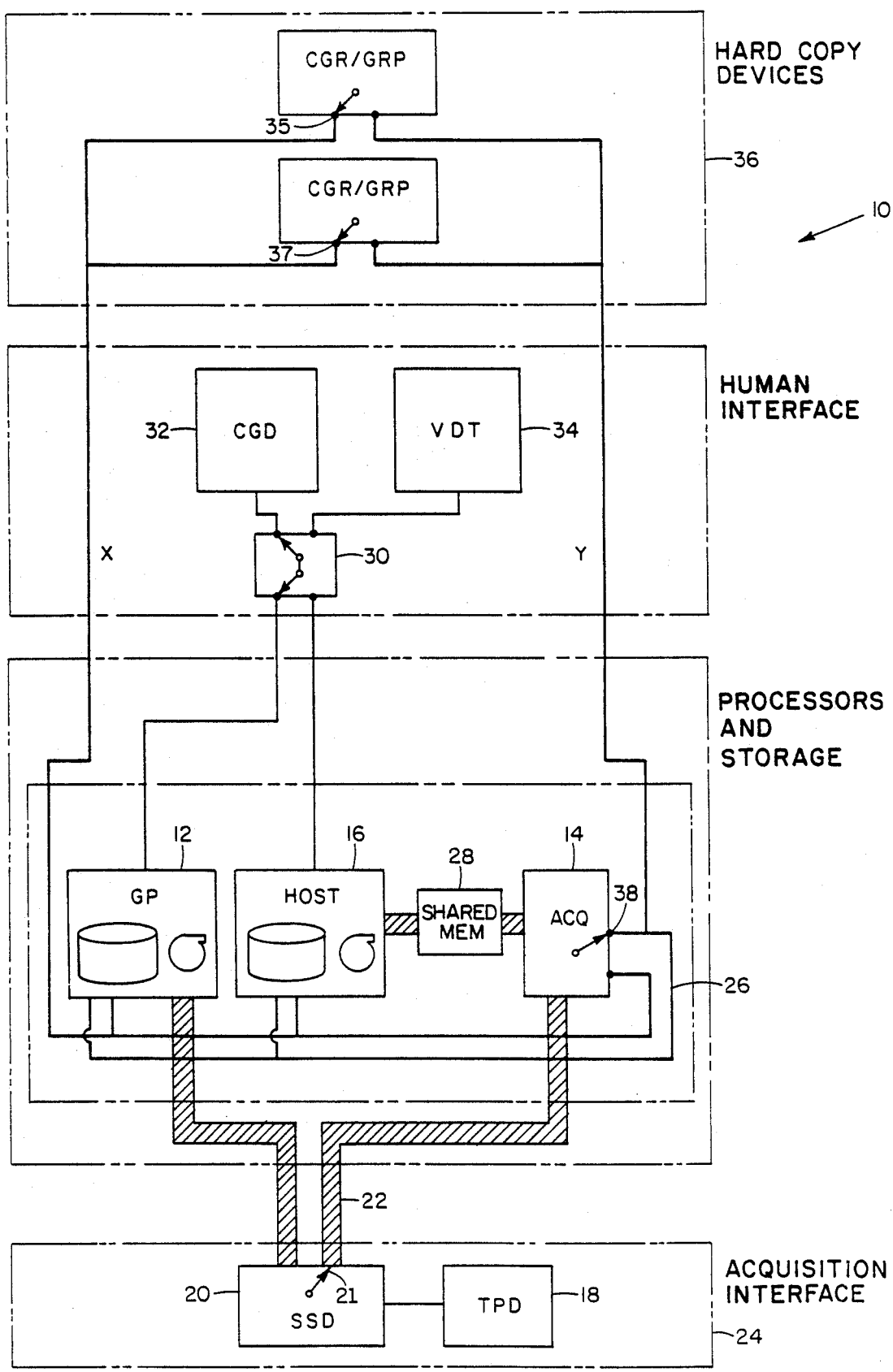
FIG. 1 is a diagram showing an exemplary system according to the present invention.

Referring to FIG. 1, system 10 is a schematic example of a well-site instrument system for logging oil wells. Data from a standard down-hole oil tool (not shown) are first inputted in conventional manner to an acquisition interface 24, in this case consisting of what is known as a tool power drawer ("TPD") 18 and a standard service drawer ("SSD") 20 which includes a switch 21. Switch 21 may be either a conventional hardware or a software switch.

The data from the down-hole tool are then fed along a parallel bus 22 to a plurality of data processor hardware component groupings, in this case to a general processor ("GP") grouping 12 and an acquisition processor ("ACQ") grouping 14. General processor unit 12, acquisition processor unit 14, and a third data processing hardware component grouping called the host processor ("HOST") grouping 16, are interconnected through a communications network 26. That network permits distributed processing by the three data processing hardware component groupings. As will become clearer in the description that follows, each of those processor groupings have assigned responsibility for performing one or more of certain discrete data processing functions. Each of those discrete data processing functions have certain minimal hardware requirements. It should be understood that each of the hardware component groupings 12, 14 and 16 have a central processor unit and such data communication, storage and interface components as are necessary to perform the discrete data processing function assigned to particular groupings. For example, as illustrated in the drawing, numeral processor grouping 12 and host processor grouping 16 include such peripherals as disks and disk controllers, tapes and tape controllers. Further, the hardware components for groupings 12, 14 and 16 are chosen such that the groupings can perform a type of inherent redundancy. In other words, the components for those hardware groupings are chosen such that there is at least one "back-up" grouping for each grouping which has sufficient hardware components not only to handle that grouping's assigned data processing tasks, but to take over the data processing functions or tasks of another grouping should that grouping fail for one reason or another. Acquisition processor grouping 14 and host processor grouping 16, in this example, share a memory 28 which permits high bandwidth data transfer between those two processors. In addition, acquisition processor grouping 14 includes a switch 38, used to switch between the communication networks 26. Switch 38 may be either a conventional hardware or software switch.

General processor grouping 12 and host processor grouping 16 are connected through a switch 30, which may either be a conventional hardware or software switch, to a color graphic display ("CGD") 32 and a back-up display ("VDT") 34. Processor groupings 12, 16, and 14 are also connected via communications network 26 to redundant hard-copy output devices, such as conventional chart and similar types of recorders as illustrated at 36. Switches 35 and 37 provide a means for switching those output devices in the event one of the processor groupings fails.

In this particular example, the overall system must be able to accomplish several discrete data processing functions, namely acquisition data processing (ACQ), general data processing (i.e. data base management and the like), and graphics.

Each of those data processing functions require particular items or components of computer hardware. As pointed out briefly above, responsibility for performing those data processing functions are separately assigned to (or "balanced over") the plurality of data processor groupings, in this case processor groupings 12, 14 and 16. Those groupings are, in turn, interconnected by communication network 26 to provide distributed processing. In initially configuring the system, the configurations for each of the three processor groupings, 12, 14, and 16 are chosen such that those configurations will permit each of those groupings to accomplish their assigned data processing task, and also to serve as a "back-up" such that most of the fault conditions can be covered.

In this case, general processor grouping 12 has sufficient peripherals and components to accomplish all three functions, namely acquisition, graphics, and general processing. In a nonfailure case, however, general processor grouping 12 handles only the graphics function.

The host processor grouping 16 is configured to handle the general processing and graphics functions, although in a nonfailure case the host processor grouping 16 only handles the general processing function. The acquisition processor 14 is configured to handle only the acquisition data processing function. Switches 21, 30, 35 and 37 provide a means to reconfigure the system in the event a component failure causes one of the processor groupings to fail.

Figure 2:
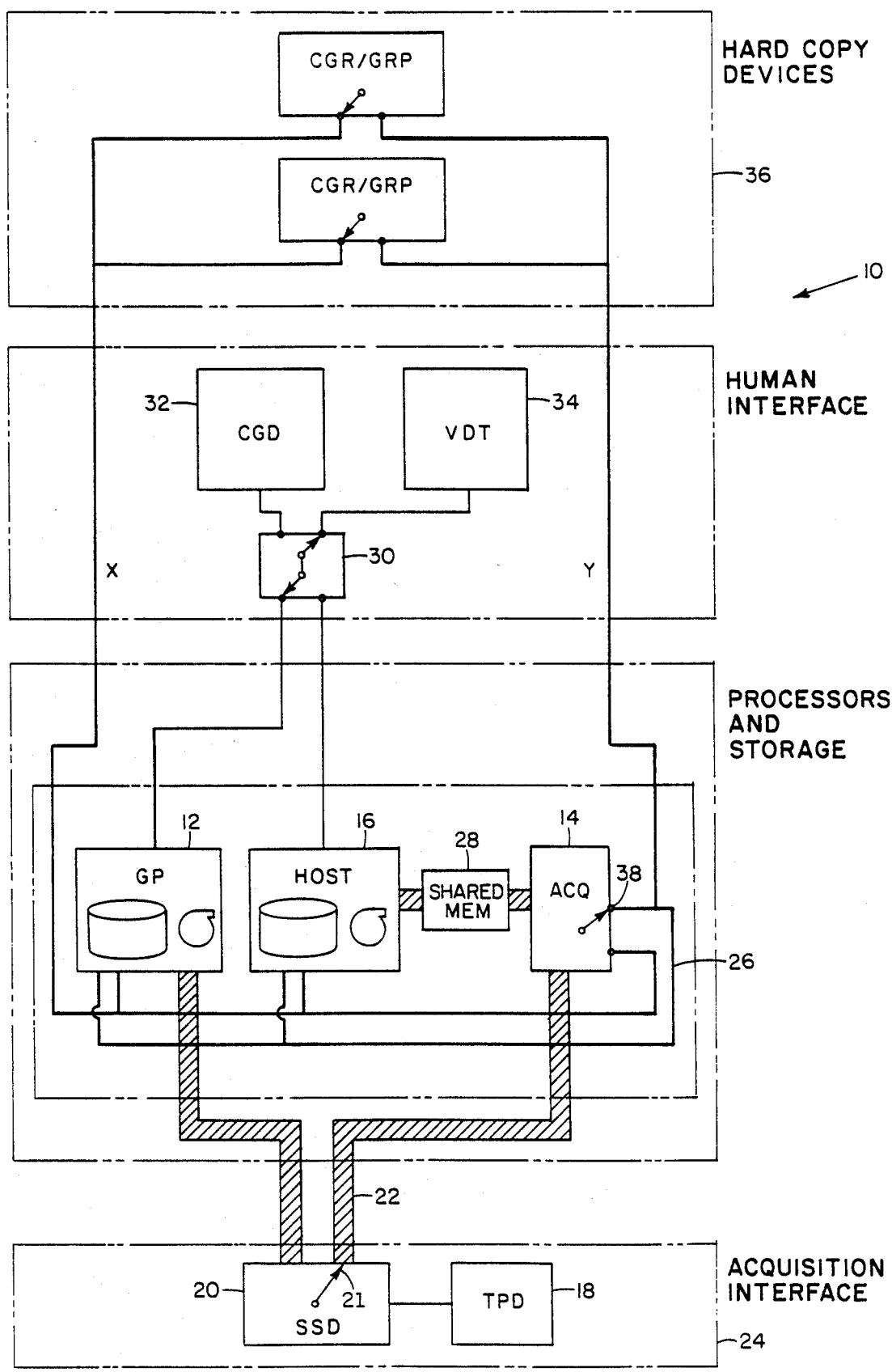
FIG. 2 is the same diagram as FIG. 1 with a failure shown.

For example, referring to FIG. 2, it is assumed that both the host processor grouping 16 and the color graphic display 32 experience a failure. In that event switch 30 is used to substitute the back-up video output terminal 34 for the failed color graphic display 32. General processor grouping 12 is then able to assume the responsibility for the general processing function previously performed by now failed host processor grouping 16.

Figure 3:
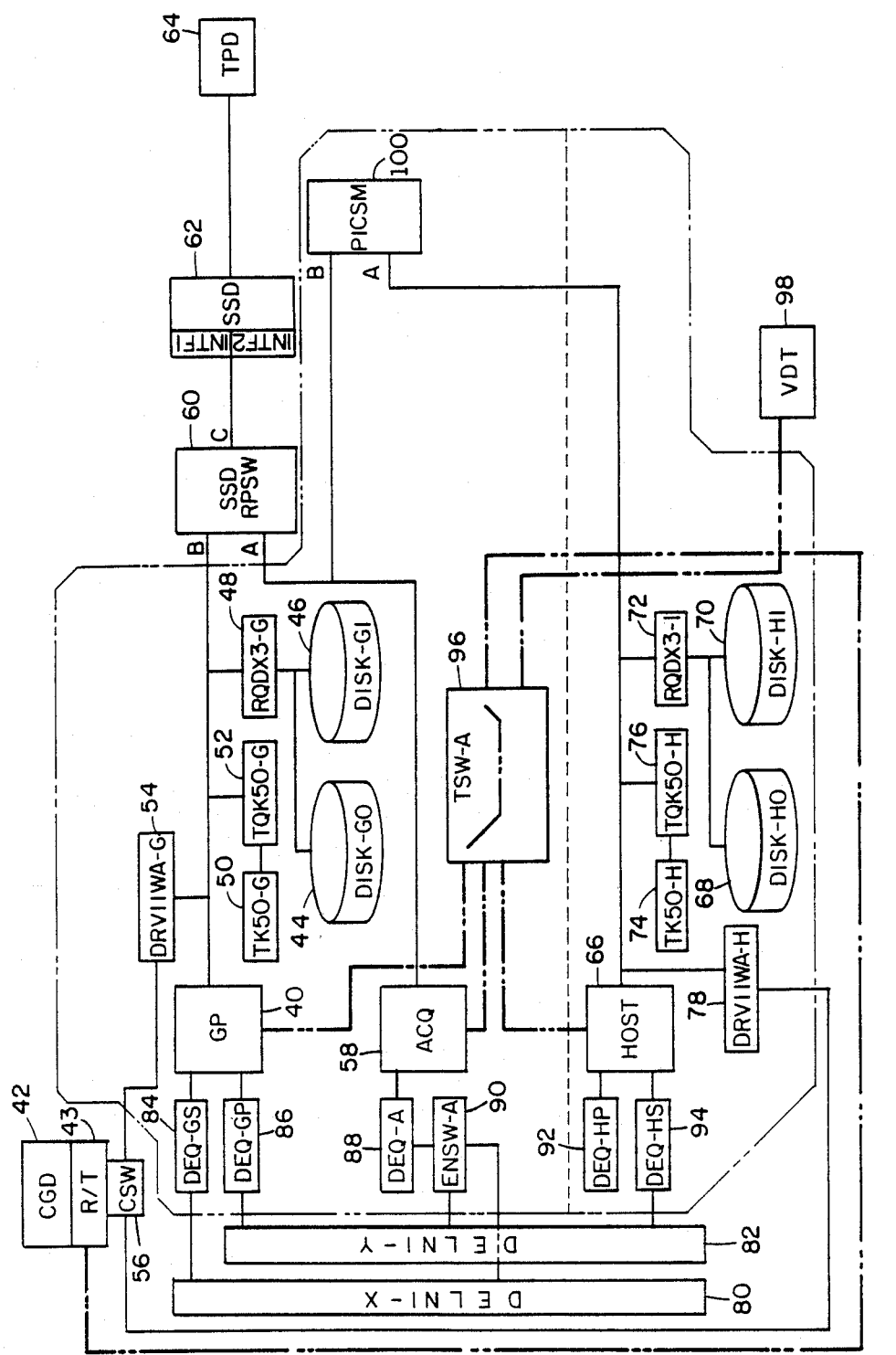
FIG. 3 is a diagram showing a more complete exemplary system according to the present invention.
Figure 4C:
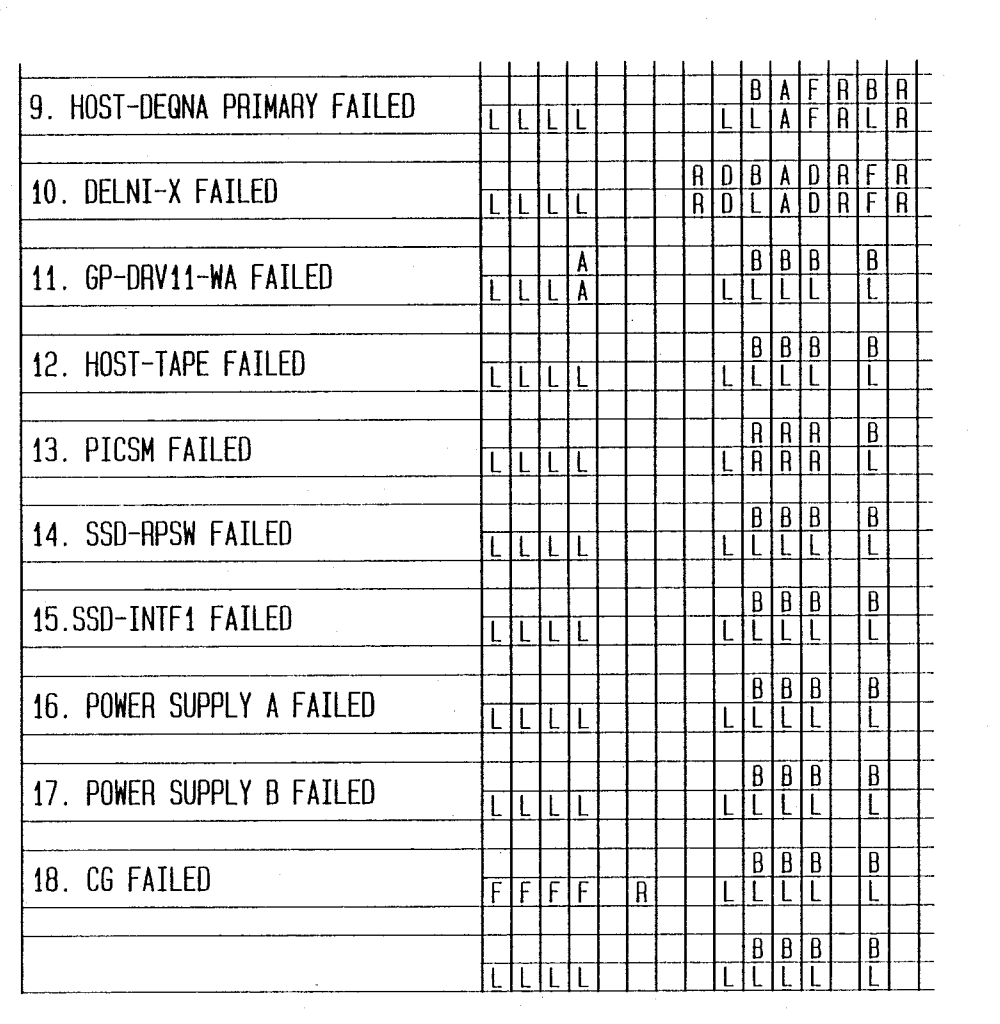
Figure 4D:
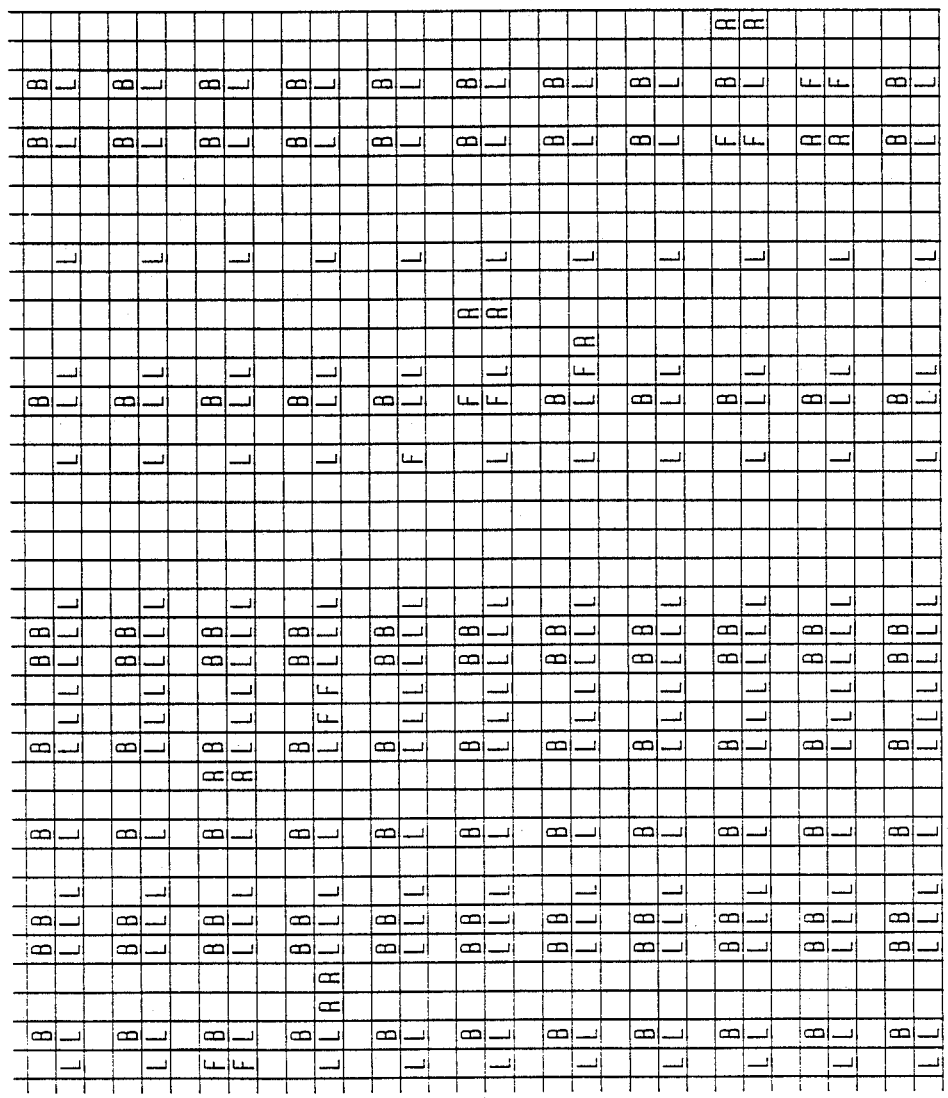

The method of the present invention will be explained in reference to FIGS. 3 and 4A through 4D. FIG. 3 illustrates a well-site instrumentation system for logging wells known as the Basic CSUF system. The configuration of that system results from the method of the present invention. In this example, the system consists of the same three processor groupings shown in simplified detail in FIGS. 1 and 2. The first processor grouping around processor 40 is the general processor grouping used specifically to generate the graphics for a color graphic display terminal 42. Two disk storage units 44 and 46 are connected through a disk controller 48 to a central processor 40. Additionally, a tape storage unit 50 is connected through tape controller 52 to central processor unit 40. Central processor unit 40 is also connected through a graphic display interface 54 and switch 56 to a color graphic display 42.

Acquisition processor 58, in this example, is used for the data acquisition function and is connected through switch 60 in the standard service drawer and communication interface 62 to a data receiver unit (the tool power drawer) 64. As in the case of FIGS. 1 and 2 above, the standard service drawer receives the data from the down-hole well-logging instrument (not shown). As it readily seen in the diagram, that data from the down-hole instrument is fed through to acquisition processor 58.

The third processor grouping includes a central processor 66 and certain peripherals and components including disk storage units 68 and 70 connected through disk controller 72 to central processor 66. A tape unit 74 is also connected to central processor 66 through tape controller 76. Central processor 66 is also connected through a graphic interface 78 and switch 56 to color graphic display 42. Processor 66 and processor 58 share a memory 100.

The three processors, 40, 58 and 66, and their related components forming the three processor groupings are connected to communication networks 80 and 82 through standard communication interface devices 84, 86, 88, 92, and 94. Thus, the three processor groupings operate in distributed processing fashion. A switch 90, corresponding to switch 38 in FIG. 1, permits the acquisition processor 58 to connect to either of the two communications networks. A switch 96 connects those three processors to a second or back-up video terminal 98.

In this particular logging system, there are five discrete "images" or data processing functions which the overall system must perform. In the present example, those images are TAO which is a knowledge base including various rules, conditions and executable programs for the particular uses of this system; HOST which is a collection of executable processes for exercising primary control of the system; GEN which is graphics environment software for creating the necessary graphics output; HI which is windowing, mouse control and similar terminal control software; and ACQ which is the data gathering or acquisition software. Those functions, of course, will vary with the particular hardware and software being utilized for the basic system. In this example, in order to execute each of those discrete data processing functions or "images," certain minimal hardware configurations are necessary. Again, although different data processing functions will require different configurations, here the first processor grouping around processor 40 and the third processor grouping around processor 66 are configured such that both can accommodate the requirements of processing TAO, GEN, HOST and HI, although in actual practice (nonfailure), HOST and TAO will run on the grouping around processor 66 and GEN and HI will run on the grouping around processor 40. The grouping around processor 40 is also configured to run ACO, although ACQ is normally run on processor 58. As illustrated in FIGS. 4A through 4D, this configuration will permit a level of reliability approximating that of a totally redundant system without the increased cost and space problems caused by a totally redundant system.

FIGS. 4A through 4D illustrates a "failure table" generated as part of the method of the present invention, and illustrates the inherent redundancy and reliability level of the present invention. The column on the left of the "failure table" shown in FIGS. 4A through 4D lists the more probable component failures based historical data. The column headings lists the various system components and the effect a component failure would have on each one of those systems.

First, it is necessary to point out that the two functions performed by the system components are booting ("B") and logging ("L"). The notations "B" and "L" in the body of the "failure table" indicate the functions performed by the various listed components.

The first group of columns entitled "CG" are those components relating to color graphics, namely the "monitor" which is the color graphic display 42, "raster-tech" 43, and "CONTSWTCH" 56. The next column headed "VT 220" refers to "VDT" 98.

The several columns headed "COM" refer to the networks DELNI-X 80 and DELNI-Y 82, and network interfaces DEQ-GS 84, DEQ-GP 86, DEQ-A 88, DEQ-HP 92, and DEQ-HS 94." Switch 90, ENSW-A, is also included within the column or groupings under "COM".

The column or groups under "GP" include those components within the processor grouping around central processor 40, including graphics interface DRVII-WA-G 54, central processor GP/MVII/MEM 40, tape unit TK50-G 50, tape controller TQK50-G 52, disk storage unit DISK-G∅ 44, disk storage unit DISK-G1 46, and disk controller RQDX3-G 48. The next column headed "ACQ" includes acquisition processor 58.

The next grouping of columns under "HOST" include those components within the grouping around central processor 66, namely graphics interface device DRVIIWA-H 78, central processor HOST/MVII/MEM 66, tape unit TK50-H 74, tape controller unit TQK50-H 76, disk storage unit DISK-H∅ 68, disk storage unit DISK-H1 70, disk controller RQDX3-H 72, and shared memory PICSM 100.

The next columns under the heading "SSD" or standard service drawer include switch 60 ("RPSW") and redundant interface devices INTF1 and INTF2 in standard service drawer 62.

The next column or heading "TPD", of course, refer to the tool power drawer 64.

Referring to the lists of "failures" on the left side of "failure table" shown in FIGS. 4A through 4D, row 1 illustrates the booting and logging functions performed by the various components with everything working. Row 2 illustrates what occurs if the host disks DISK-H∅ 68 and DISK-H1 70 fail. As noted in the "failure table", the failed disk storage is replaced by activating switch 56 ("CONTSWTCH") which now permits use of the disk storage and controller components associated with general processor 40, namely DISK-G0 44, DISK-G1 46, and RQDX3-G 48, respectively.

Referring to row 3, if host processor 66 fails, that disables the component grouping around processor 66. However, as illustrated in the "failure table," those functions can now be replaced by the component grouping around processor 40.

Referring to row 4, if disk storage units DISK-G0 44 and DISK-G1 46 with disk controller RQDX3-G 48 fail, those functions can be replaced by the corresponding disk storage and disk controller component of the grouping around processor 66, namely disk storage units 68 and 70, and disk controller 72.

Referring to row 5, if processor 40 fails, that disables the component grouping around that processor, however, activating switch 56 now permits the component grouping around processor 66 to assume the functions of the failed equipment.

Referring to row 6, if acquisition processor 58 fails, activating switch 56 and switch 60 permits the acquisition data processing function to be assumed by the component grouping around processor 40.

Referring to row 7, if the interface DEQ-GS 84 fails, that function will be replaced by interface DEQ-GP 86 and DEQ-HS 94. Referring row 8, if the interface DEQ-A 88 and/or switch ("ENSW-A") 90 on acquisition processor 58 fail, that will disable acquisition processor 58. However, activating switch 60 now permits the functions previously performed by acquisition processor 58 to be assumed by the component grouping around processor 40 (see row 6).

Referring to row 9, if interface DEQ-HP 92 fails, switch 90 is activated and replaces its function with DEQ-HS 94 and DELNI-Y 82. In row 10, if DELNI-X 80 fails, that disables DEQ-GS 84 and DEQ-HP 92. However, those functions are replaced by DEQ-GP 86, DEQ-HS 94, and DELNI-Y 82. In row 11, if the graphics interface 54 fails, switch 56 may be activated and serve to replace that function with interface 78. In row 12, in the event tape and/or tape controller 74 or 76 fail, those functions may be replaced by tape unit 50 and tape controller 52. If shared memory 100 fails, row 13, that function may be replaced through interface DEQ-A 88, ENSW-A 90, and DEQ-HP 92. In row 14, if switch 60 fails, recovery is through a replacement spare switch. Referring to row 15, if first interface INTF1 fails, that function is replaced by backup interface INTF2.

Rows 16 and 17 refer to power supplies, not shown, and simply point out that if one power supply fails, it is replaced by the other.

Row 18 illustrates that if the color graphics system fails, it is replaced by VDT98, upon activating switch 96.

As can be seen, the system of the present invention permits recovery from the most typical component failures through reconfiguring the system from the first configuration to a second configuration by transferring the data functions performed by one of the processor component groupings to another. Thus, a reliability level approximating that of a total hardware redundant system is possible without incurring the costs and other problems exhibited by such totally redundant systems.

The method of the present invention is applicable to a variety of distributed processing environments. As pointed out above, the overall data processing functions which must be performed by a particular system will vary with the particular application. Furthermore, each of such discrete data processing functions will require varying hardware configurations.

Therefore, the method of the present inventions begins with identifying the discrete data processing functions the entire well-logging data acquisition and interpretation system must perform. In the present example, of course, those functions are TAO, HOST, GEN, HI, and ACQ. That step must include identifying any particular rules, assumptions, and constraints imposed by the data processing requirements of the system. Those rules, assumptions and constraints will, of course, vary depending upon the particular hardware used, and the types of software used, and the intended functions of the system.

The second step of the method is to analyze those discrete data processing functions to determine the minimal hardware requirements necessary to perform each of those discrete functions. The third step of the method of the present invention is to select a plurality of data processor hardware component groupings, such as those groupings around processors 40, 58, and 66. Each of such hardware groupings should have as one component at least one central processor and as additional components the minimal hardware peripherals, such interface units, tape drives and controllers, disk drives and controllers, shared memory elements, booting equipment and so forth, required for such groupings to perform at least one of the discrete data processing functions required. All of the data processor hardware groupings, of course, collectively, but not individually, should have all of the minimal hardware components necessary to perform all of the discrete data processing functions of the system.

The fourth step is to selectively assign responsibility for performing the discrete data processing functions to the data processor hardware component groupings such that the responsibility for performing the overall system data processing functions are distributed among the data processor hardware component groupings without duplication. At this stage, of course, the configuration would consist of the minimal hardware, arranged in component groupings which would be necessary to perform the required data processing. There may or may not, however, be any built-in redundacy in the event of component failure. In order to ascertain what redundancy does exist, what redundancy must be added, and how the system should be reconfigured in the event of a component failure, the fifth step of the method of the present invention requires an identification, from historical hardware component reliability data, of the components used in the hardware component groupings which are most likely to fail. That step would thus proceed with generation of a "failure table" such as that shown in FIGS. 4A through 4D.

The sixth step of the method of the present invention requires an analysis, for each component failure, to determine which of the discrete data processing functions are disabled by component failure, and which of the remaining hardware component groupings, if any, have the requisite components necessary for assuming responsibility for performing the disabled data processing function. In the event the existing hardware component groupings do not have the components necessary to assume responsibility for performing the disabled data processing functions, the seventh step of the method of the present invention requires selectively adding hardware components to the hardware component groupings until at least one other hardware component grouping contains the hardware components necessary to perform the data processing function disabled by a particular component failure. That process continues until the resultant data processing hardware groupings contain the components necessary to permit recovery from system component failures by selectively transferring responsibility for performing the assigned data processing functions from the data processor hardware component groupings containing one or more failed components to a data processor hardware component grouping having the components necessary to perform the transferred processing function.

The result of the process of the present invention is to achieve to an overall hardware configuration which utilizes minimal component redundancy to achieve a reliability level approximately that of a totally hardware redundant system by effectively utilizing the inherent redundancy of a distributed processing system and the ability to reconfigure the system and transfer data processing functions as necessary to recovery from component failure.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

We claim:

1. A reconfigurable well-logging data acquisition system for performing a plurality of discrete data processing functions and which achieves a level of system reliability approximating that of a redundant system, but without total hardware redundancy, comprising:

(a) means for inputting well-logging data into the system;

(b) an acquisition processor for executing data acquisition software operably connected to said well-logging data input means;

(c) a general processor for executing graphics and terminal control software and having the capability of executing data acquisition, general data processing and supervisory control software operably connected to a first peripheral disk unit and said well-logging data input means;

(d) a host processor for executing general data processing and supervisory control software and having the capability of executing graphics and terminal control software operably connected to a second peripheral disk unit;

(e) a communications network operatively connecting each of said processor groupings to one another such that the system software can be booted into all three of said processors from either of said first or second disk units, wherein said communications network comprises two redundant networks and means for switchably interfacing each network to each of said processors;

(f) a color graphics display terminal switchably connected to either said general processor or said host processor through separate graphics interfaces; and (g) a back-up video display terminal with a means for switchably and operably connecting all three of said processors to said back-up video display terminal wherein said back-up video display connecting means also switchably and operably connects all three of said processors to said color graphics display terminal which can thereby be driven in the same manner as said back-up video display terminal in the event the graphics interfaces fail.

2. The reconfigurable well-logging data acquisition system as set forth in claim 1 further comprising an additional memory shared by said acquisition processor and said host processor which permits high bandwidth data transfer between the processors even when both of said redundant communications networks fail.

3. A reconfigurable well-logging data acquisition system for performing a plurality of discrete data processing functions and which achieves a level of system reliability approximating that of a redundant system, but without total hardware redundancy, comprising:

means for inputting well-logging data into the system;

a plurality of central processing units and associated peripheral units which are grouped into component groupings for performing each of said discrete data processing functions and wherein each grouping contains at least one central processing unit;

means for allowing a central processing unit or peripheral unit to be a member of more than one group;

a separate software module for performing each of said discrete data processing functions when said module is booted onto a central processing unit;

a communications network operatively connecting each of said central processing units to one another;

means for booting said software modules onto any of said central processing units;

means for switchably connecting said peripheral units to alternate central processing units;

wherein said plurality of peripheral units comprises a color graphics display terminal switchably connected to a plurality of said central processing units through separate graphics interfaces and a back-up video display terminal;

means for switchably and operably connecting all of said central processing units to said back-up video display terminal wherein said back-up video display connecting means also switchably and operably connects all of said plurality of central processing units to said color graphics display terminal which can thereby be driven in the same manner as said back-up video display terminal in the event one or more of the graphics interfaces fail; and means for reconfiguring each of said component groupings so that different data processing functions are performed in the event one or more components become inoperable by booting another software module onto the central processing units.

4. The system as set forth in claim 2 additionally comprising a memory shared between two of said central processing units which permits high bandwidth data transfer between said central processing units when said communications network fails.

* * * * *